United States Patent
Neumair et al.

(10) Patent No.: US 8,444,113 B2
(45) Date of Patent: May 21, 2013

(54) SCREW IN MULTI-WAY SEAT VALVE

(75) Inventors: Georg Neumair, Thalhausen (DE); Bernd Faber, Freising (DE); Engelbert Zwingler, Feldkirchen-Westerman (DE)

(73) Assignee: HAWE Hydraulik SE, Munich (DE)

( * ) Notice: Subject to any disclaimer, the term of this patent is extended or adjusted under 35 U.S.C. 154(b) by 316 days.

(21) Appl. No.: 12/818,783

(22) Filed: Jun. 18, 2010

(65) Prior Publication Data
US 2011/0001071 A1    Jan. 6, 2011

(30) Foreign Application Priority Data
Jun. 24, 2009  (EP) .................................. 09008277

(51) Int. Cl.
 *F16K 1/42* (2006.01)
(52) U.S. Cl.
 USPC ...................................... 251/365; 251/129.15
(58) Field of Classification Search
 USPC ............... 251/129.15, 359, 365; 137/454.2, 137/454.5, 315.03, 315.11, 625.65, 625.67
 See application file for complete search history.

(56) References Cited

U.S. PATENT DOCUMENTS

| | | | | |
|---|---|---|---|---|
| 2,301,355 A * | 11/1942 | Armentrout | ..................... | 138/45 |
| 2,399,102 A * | 4/1946 | Carver | .......................... | 251/365 |
| 3,544,065 A * | 12/1970 | Mercier | ......................... | 251/284 |
| 3,583,233 A * | 6/1971 | Jacoby et al. | .............. | 73/864.83 |
| 3,724,813 A * | 4/1973 | Baumann | ...................... | 251/360 |
| 4,542,879 A * | 9/1985 | Stein | ............................. | 251/360 |
| 4,766,927 A * | 8/1988 | Conatser | .................. | 137/315.27 |
| 4,834,337 A | 5/1989 | Chorkey et al. | | |
| 5,113,898 A | 5/1992 | White et al. | | |
| 5,161,566 A * | 11/1992 | Scaramucci | ................... | 137/328 |
| 5,333,836 A * | 8/1994 | Fukuyo et al. | ........... | 251/129.15 |
| 6,889,702 B2 * | 5/2005 | Hall et al. | ................ | 137/315.41 |
| 6,974,117 B2 * | 12/2005 | Dzialakiewicz et al. | | 251/129.08 |
| 7,014,170 B2 * | 3/2006 | Wears et al. | .................. | 251/360 |
| 2008/0251748 A1 * | 10/2008 | Neff et al. | ................ | 251/129.15 |

FOREIGN PATENT DOCUMENTS

| | | |
|---|---|---|
| DE | 4118190 | 5/1991 |
| GB | 220219 | 8/1924 |
| GB | 233850 | 5/1925 |

OTHER PUBLICATIONS

European Search Report for EP 09008277.7 dated Dec. 9, 2009.
HAWE Hydraulik Technical Brochure D 7921 "Valve Type BE" dated Mar. 2008 (DE).
HAWE Hydraulik Technical Brochure D 7921 "Valve Type BE" dated Mar. 2008 (English).

* cited by examiner

*Primary Examiner* — John K Fristoe, Jr.
*Assistant Examiner* — Umashankar Venkatesan
(74) *Attorney, Agent, or Firm* — Cook Alex Ltd.

(57) ABSTRACT

In a screw-in multi-way seat valve V comprising a screw-in housing 1, in which at least one sleeve 21 is positioned axially which sleeve 21 forms a valve seat 20, and a valve member 15 provided inside and having a seat surface 31 with a larger outer diameter than the inner diameter of the valve seat 20, the sleeve 21 is axially positioned in the screw-in housing 1 by a threaded connection 23 and at the same time is sealed by a press fit zone 24, the press fit zone 24 forming an anti-rotation protection for the threaded connection 23.

6 Claims, 1 Drawing Sheet

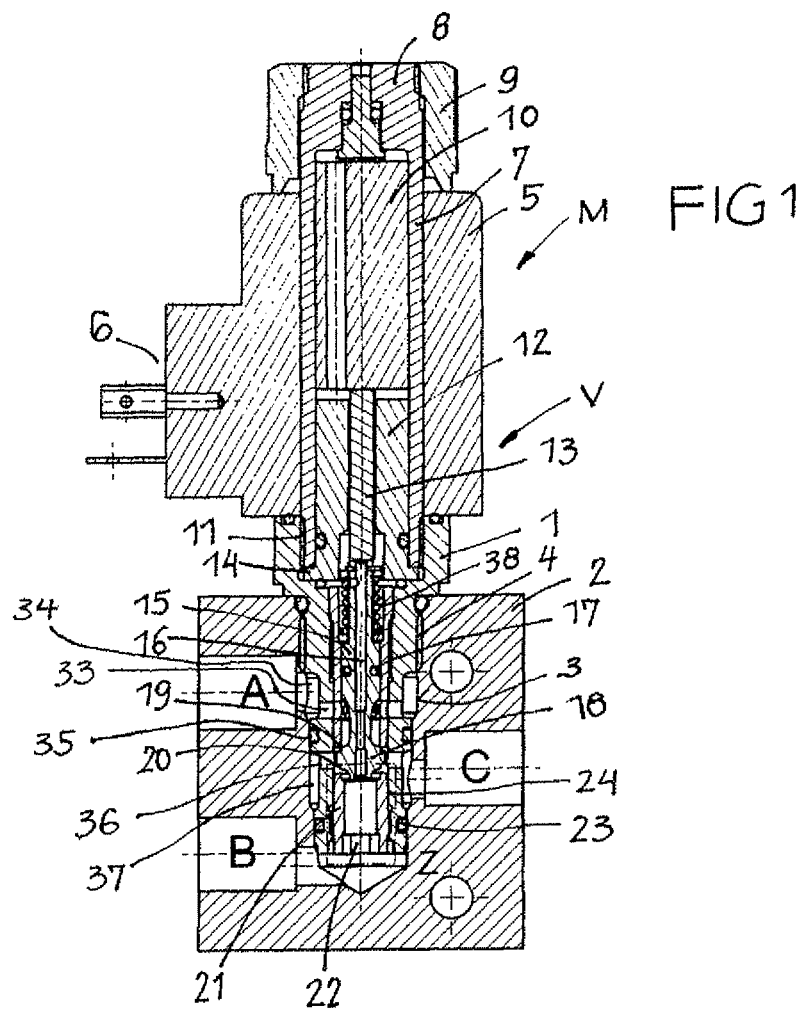
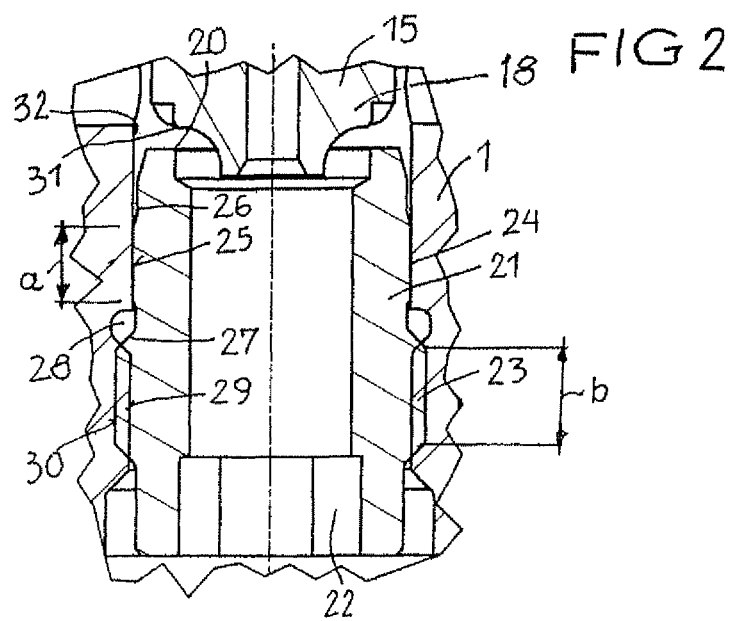

SCREW IN MULTI-WAY SEAT VALVE

BACKGROUND

The invention relates to a screw-in multi-way seat valve according to the preamble of claim 1.

Such a screw-in multi-way seat valve is known from the technical brochure D7921 "Screw-in Seat Valve Type BVE", March 2008-00, of the company HAWE Hydraulik SE, Streitfeldstrasse 25, 81673 Munich, DE. The screw-in housing of the known screw-in multi-way seat valve is unitary with the solenoid tube of the actuating solenoid (page 4 of the technical brochure D7921) and ends with an exterior thread section. A first sleeve is pressed from below into the screw-in housing in sealed fashion. A first valve seat is formed at the first sleeve. The valve member is inserted through the first sleeve and the screw-in housing from below before, due to the larger outer diameter of the seat surface of the valve member, a second sleeve is pressed from below into firm abutment on the first sleeve. A second valve seat is provided in the second sleeve. Both seat surfaces of the valve member alternatingly cooperate with both valve seats when the valve member executes a stroke of about 0.8 mm to 1.0 mm and when an armature of the actuating solenoid pulls counter to the force of a closing spring. In the threaded-in condition of the screw-in multi-way seat valve the second sleeve is pressed into abutment against a shoulder of a stepped bore. A pole core of the actuating solenoid is axially fixed at a stop via the first sleeve. Several structural separation regions exist is axial direction between the armature of the actuating solenoid and the second valve seat such that, due to unavoidable manufacturing tolerances, the axial distance between the first and second valve seats and the distances of the first and second valve seats from the armature may undesirably fluctuate within a production series. A subsequent adjustment to compensate for such fluctuations is impossible without dismantling several components and without expensive re-machining of components. However, compensating for such fluctuations would be important in order to achieve an optimum and constant relationship between the course of the solenoid force and the stroke of the valve member within a production series.

Further prior art is contained in: U.S. Pat. No. 4,542,879 A, DE 41 18 190 A, GB 233 850 A, GB 220 219 A and U.S. Pat. No. 4,834,337 A.

SUMMARY

It is an object of the invention to provide a structurally simple and fair cost screw-in multi-way seat valve which allows at any time to comfortably match the course of the solenoid force and the stroke of the valve member without machining of components.

This object is achieved by the features of claim 1.

As only a single sleeve is provided in the screw-in housing, which single sleeve can be machined in a simple fashion and which can be mounted easily, the number of parts of the valve is reduced, resulting in a production for fair costs. As the single sleeve is axially positioned by the tightened threaded connection and at the same time is sealed in the press fit zone in the screw-in housing, which press fit zone establishes an efficient anti-rotation protection against uncontrolled untightening of the threaded connection, the axial position of the valve seat of the sleeve in relation to the screw-in housing and, in turn, in relation to the actuating solenoid can be adjusted at any time, such that by threading the threaded connection an optimum match can be achieved between the course of the solenoid force and the stroke of the valve member. The press fit zone seals between both axial sides of the valve seat in the sleeve such that the leakage-free blocking position of the screw-in multi-way seat valve can not be jeopardised by an insufficient sealing effect of the threaded connection. Mounting the sleeve in the screw-in housing can be executed in a simple fashion as it is not required to execute a pressing step but a threading process only.

Expediently the press fit zone is formed between circular cylindrical fitting surfaces in the screw-in housing and at the sleeve. By selecting the tolerance or press fit and the axial extension of the press fit zone both an optimum sealing effect and a satisfactory anti-rotation protection can be achieved in a technically simply way. A maximum fixation in the press fit zone is dictated by the strength of the material of the screw-in housing and of the sleeve with a view to a sufficiently comfortable effort to mount the sleeve by a threading action which sleeve, expediently, is made from steel. The minimum fixation effect in the press fit zone is dictated by the required tightness and the safety against uncontrolled untightening of the threaded connection in case of vibrations or axially varying pressure forces.

As soon as the sleeve is mounted in the screw-in housing the axial position of the sleeve can be adjusted in the screw-in housing at any time by a relative rotation between the screw-in housing and the sleeve by using the threaded connection. In this fashion within a production series the same constant match can be adjusted between the course of the solenoid force and the stroke of the valve member. Expediently, there may be particularly well machined threaded sections in the threaded connection, and, in some cases, mounting may be carried out by using lubricants.

In order to facilitate fine tuning it may be expedient to form the threaded connection from fine pitch threads.

The diameters of the threaded connection and of the press fit zone may be substantially equal. This does not exclude to select those diameters differently in case of specific requirements.

In an expedient embodiment the axial extension of the threaded connection is at least somewhat larger than the axial extension of the press fit zone. Due to this relative dimensioning the available axial structural length is well used, a sufficiently long adjustment range for mounting the press fit zone is provided, and a sufficient thread carrying length is achieved for producing the necessary fixation in the press fit zone.

Expediently, the outer diameter of the sleeve gradually decreases in continuation of the fitting surface in order to facilitate the introduction of the sleeve by using enough lubricant during assembly. This has to assure that the threaded connection already has sufficient carrying length when the fitting surfaces increasingly are pushed into each other and at the same time are rotated in relation to each other.

With a view to manufacturing it is advantageous that a diameter step is provided at the sleeve between the respective fitting surface and the respective thread section, and that a circumferential groove is formed in the screw-in housing. The diameter step at the sleeve facilitates machining when forming the fitting surface and the thread section. The same effect is achieved by the circumferential groove in the screw-in housing. Furthermore, the circumferential groove forms a free space where lubricant used during assembly may accumulate. Finally, the circumferential groove has an influence on the size of the adjustment range of the sleeve in the screw-in housing.

With a view to simple manufacturing a screwing handhold is formed in the sleeve. The screwing handhold, expediently, is an interior hexagonal socket presenting large force transmitting surfaces to an inserted rotation tool in order to transmit the required high torque without problems.

In an expedient embodiment the screw-in housing extends over the sleeve and at least approximately to the free end of the sleeve. The screw-in housing has two grooves at the outside for receiving sealings, e.g. O-rings, and as such fulfils the task of the sealing function between zones of different pressures in the stepped bore as soon as the screw-in multi-way seat valve is mounted for operation.

In a further embodiment two axially spaced apart arrays of lateral passages are formed in the screw-in housing. In-between these arrays a further valve seat is formed directly in the interior of the screw-in housing. This design contributes to a reduction of the number of parts and allows to provide sufficiently large through flow cross-sections.

Furthermore, the lateral passages may lead respectively to an annular groove at the outer side of the screw-in housing in order to provide large through flow cross-sections also at the outer side of the screw-in housing.

In the operative position the screw-in multi-way seat valve is threaded with the screw-in housing into a stepped bore, preferably of a block, into abutment at the mouth of the stepped bore. However, then an intermediate distance is maintained between the end of the screw-in housing and the free end of the sleeve and a bottom shoulder of the stepped bore such that neither the screw-in housing nor the sleeve come into firm abutment in this interior region of the stepped bore. This design allows to dispense with a further precisely i.e. tolerance bound machined end surface at least at the screw-in housing. Furthermore, the axial intermediate distance allows that the sleeve protrudes beyond the end of the screw-in housing.

In order to achieve a further structural simplification a solenoid tube of the actuating solenoid is structurally separated from the screw-in housing. The solenoid tube is threaded into abutment into the screw-in housing and at the same time serves to fix an outer flange of a pole core. This facilitates use of a simple solenoid tube which can be manufactured easily and for fair cost. The solenoid tube axially positions the pole core in the screw-in housing but does not need a firm abutment in the stepped bore as is the case in the known screw-in multi-way seat valve.

BRIEF DESCRIPTION OF THE DRAWINGS

An embodiment of the invention will be explained with the help of the drawings. In the drawings:

FIG. 1 is a longitudinal sectional view of a screw-in multi-way seat valve with solenoid actuation mounted in a block, and FIG. 2 is a detail of FIG. 1 in enlarged scale.

DETAILED DESCRIPTION

FIGS. 1 and 2 illustrate a screw-in multi-way seat valve V, in the present case a 3/2-way seat valve, which is mounted in a block between three ports A, B, C leading to a stepped bore 3. At least some of the most important hydraulic components of the screw-in multi-way seat valve V, like optionally also the block 2 (which, in some cases, may be part of the housing of a hydraulic cylinder) are made from steel. In an alternative embodiment the screw-in multi-way seat valve V could be a 2/2-way seat valve (not shown). (3/2 means three ways and two positions, i.e. two ways at one side of the valve and a third way at the other side of the valve with one of the two ways on one side of the valve being connected with the third way alternatingly in a respective position of the two positions of the valve while the respective other of the two ways is blocked in leakage-free fashion; 2/2 means two ways and two positions, and the valve operating such that in one position the two ways are connected while in the other position of the valve the two ways are separated from each other in leakage-free fashion.)

The screw-in housing 1 of the screw-in multi-way seat valve V is screwed into the stepped bore 3 in the block 2 and is fixed by a thread 4 in firm and sealed abutment at the mouth of the stepped bore.

The actuating solenoid M e.g. is a black/white solenoid (on/off solenoid), however, instead could be a proportional solenoid. The actuating solenoid M has an outer coil casing 5 with electrical connections 6. A solenoid tube 7 is slid over the coil casing 5 and is tightened into abutment against the screw-in housing 1 by a gland nut 9 threaded on a closing end 8 of the solenoid tube 7. An armature 10 is contained in the solenoid tube 7. The solenoid tube 7 is fixed in the screw-in housing 1 at its lower end with a thread 11 and spans an outer flange 14 of a pole core 12 against a shoulder in the screw-in housing 1. This region is hermetically sealed at the lower side. A push rod 13 is slidably contained in the pole core 12. The armature 10 actuates via the push rod 13 a valve member 15 counter to the force of a closing spring 38. The valve member 15 is sealed and slidably guided (O-ring 17) in the screw-in housing 1 and contains a central longitudinal bore 16. The valve member 15 has a thickened region 18 at the lower end. Upper and lower annular seat surfaces (e.g. seat surface 31 in FIG. 2) are formed on the thickened portion 18. One of the seat surfaces alternatingly co-acts with a valve seat 19 in the screw-in housing 1 and a valve seat 20 in a sleeve 21, respectively. The outer diameters of the seat surfaces and the diameter of the thickened region 18 are larger than the inner diameters of the valve seats 19, 20.

The reason to structurally separate the sleeve 21 with the valve seat 20 from the screw-in housing 1 and to insert the sleeve 21 into the screw-in housing 1 is that the valve member 15 has to be mounted with the thickened region 18 inside first before the lower valve seat 20 is mounted.

The sleeve 21 is seated in the lower end of the screw-in housing 1 and has a rotation handhold 22, e.g. an internal wrench hexagon socket, and is axially positioned in the screw-in housing 1 by a threaded connection 23 which, preferably, consists of fine pitch thread sections. At the same time, the sleeve 21 is sealed in the screw-in housing 1 by an established press fit zone 24 such that the press fit zone 24 simultaneously forms an anti-rotation protection for the threaded connection 23.

The threaded connection 23 is arranged in FIG. 2 below the press fit zone 24 which is located above the threaded connection 23. The axial extension of the threaded connection 23 is illustrated by b and is, preferably, somewhat larger than the axial extension a of the press fit zone 24. The threaded connection 23 is formed by thread sections 29, 30 at the sleeve 21 and within the screw-in housing 1 which sections are threaded into each other, while the press fit zone 20 is formed between circular cylindrical fitting surfaces 25 and 32 at the sleeve 21 and in the screw-in housing 1 which fitting surfaces are axially pressed into each other.

In continuation of the fitting surface 25 the outer diameter of the sleeve 21 decreases at 26, e.g. at a conical shoulder. A further diameter step 27 may be formed between the fitting surface 25 and thread section 29. The fitting surface 32 in the screw-in housing 1 is separated from the interior thread section 30 by a circumferential groove 28.

In the mounted position in FIG. 1 the lower end of the screw-in housing 1 as also the free end of the sleeve 21 are arranged without firm abutment with an axial intermediate distance from the bottom of the stepped bore 3. A flow connection extends from port A through the stepped bore 3 and an annular groove 34 as well as lateral passages 33 in the screw-in housing 1 to the upper valve seat 19. Another flow connection extends from port C through the stepped bore 3 and an annular groove 37 of the screw-in housing 1 and further lateral passages 36 to an intermediate space between the valve seats 19, 20. Finally, the port B is in flow connection with the valve seat 20 via the bottom of the stepped bore 3 and an internal bore of the sleeve 21.

In FIG. 1 the actuating solenoid M is in current-free condition. The valve member 15 is pulled upwardly by a closing spring 38 such that the upper valve seat 19 is blocked without leakage. Port A is separated from port C. The lower valve seat 20 (see FIG. 2) is cleared from the seat surface 31 at the lower side of the thickened portion 18 such that the flow connection is open from port B to port C. If current is supplied to the actuating solenoid M, the armature 10 is pulled to the pole core 12. The valve member 15 is moved via the push rod 13 counter to the force of the closing spring 38 downwardly until (FIG. 2) the seat surface 31 is seated on the valve seat 20. Then port B is separated from port C without leakage, while now port A is connected to port C via the valve seat 19.

In order to adjust the axial position of the valve seat 20 relative to the valve seat 19 and relative to the pole core 12, in particular with a view to an optimum relationship between the course of the solenoid force and the stroke of the valve member 15, only the sleeve 21 needs to be rotated by use of the rotation handhold 22 relative to the screw-in housing 1. The axial distance from the pole core 12 then can be made larger or smaller.

When mounting the sleeve 21 in the screw-in housing 1 for the first time, expediently, lubricant is used, in order to axially push the fitting surface 25, 32 into each other and to rotate them in relation to each other when the threaded connection 23 is established with sufficiently long thread carrying length. The press fit between the, preferably substantially cylindrical, fitting surfaces 25 and 32 is expediently chosen so that between ports B and C within the screw-in housing 1 a tightness is achieved which does not allow any leakage, and such that in case of unavoidable vibrations or hydraulic pressure impacts the threaded connection 23 will not be untightened or tightened further in uncontrolled fashion.

In the shown embodiment the press fit zone 24 is located above the threaded connection 23. An inverted arrangement would also be possible. The rotational handhold 22 does not need to be arranged inside of the sleeve 21 but instead could be arranged e.g. at the outer side at the free end of the sleeve 21.

A first adjustment, e.g. needed to optimally match the course of the solenoid force with the stroke of the valve member 15 between the valve seats 19, 20 may be made when mounting the sleeve 21 for the first time in the screw-in housing 1. The adjustment or setting carried out can be pretested such that in a production series of several screw-in multi-way seat valves V fluctuations are avoided despite unavoidable manufacturing tolerances. However, it is also possible to carry out adjustments later. For such subsequent adjustments the screw-in multi-way seat valve V may be removed from the block 2 in order to provide access to the rotational handhold 22.

The invention claimed is:

1. Screw-in solenoid-actuated multi-way seat valve made from steel for high pressure hydraulic applications, comprising a screw-in housing, a sleeve forming at least one valve seat, the sleeve being axially positioned in the screw-in housing, and an interior valve member having at least one seat surface with a larger outer diameter than the inner diameter of the valve seat, wherein the sleeve is axially positioned in the screw-in housing by a threaded connection and is sealed in the screw-in housing by a press fit zone formed by at least portions of two mutually contacting metallic circular cylindrical fitting surfaces in the screw-in housing and at the sleeve, which are axially pressed into each other, respectively, the press fit zone forming an anti-rotation protection for the threaded connection, wherein the axial position of the sleeve within the screw-in housing is adjustable by a relative rotational adjustment between the screw-in housing and the sleeve via the threaded connection and a rotation of the circular cylindrical fitting surfaces in relation to each other.

2. Screw-in solenoid-actuated multi-way seat valve according to claim 1, wherein the threaded connection includes fine pitch thread sections in the screw-in housing and at the sleeve, respectively.

3. Screw-in solenoid-actuated multi-way seat valve according to claim 1, wherein an axial extension of the threaded connection is larger than an axial extension of the press fit zone.

4. Screw-in solenoid-actuated multi-way seat valve according to claim 1, wherein an outer diameter of the sleeve decreases in continuation of the circular cylindrical fitting surface of the sleeve.

5. Screw-in solenoid-actuated multi-way seat valve according to claim 1, wherein a diameter step is provided at the sleeve between the circular cylindrical fitting surface and a thread section of the sleeve, and wherein a circumferential groove is formed in the screw-in housing between the circular cylindrical surface and the thread section of the screw-in housing.

6. Screw-in solenoid-actuated multi-way seat valve according to claim 1, wherein a rotation handhold is provided in the sleeve.

* * * * *